United States Patent [19]
Yamashita

[11] Patent Number: 5,293,033
[45] Date of Patent: Mar. 8, 1994

[54] OPTICAL READING APPARATUS

[75] Inventor: Yasuhisa Yamashita, Shizuoka, Japan

[73] Assignee: Tokyo Electric Co., Ltd., Tokyo, Japan

[21] Appl. No.: 831,000

[22] Filed: Feb. 5, 1992

Related U.S. Application Data

[63] Continuation of Ser. No. 407,940, Sep. 15, 1989, abandoned.

[30] Foreign Application Priority Data

Sep. 20, 1988 [JP] Japan .................. 63-235420
Sep. 20, 1988 [JP] Japan .................. 63-235421

[51] Int. Cl.$^5$ .................................. G06K 7/10
[52] U.S. Cl. ........................ 235/462; 235/383; 235/472
[58] Field of Search ............ 238/383, 468, 471, 472, 238/462

[56] References Cited

U.S. PATENT DOCUMENTS

| | | | |
|---|---|---|---|
| 3,774,014 | 11/1973 | Berler | 235/471 |
| 4,065,343 | 12/1977 | Stumpe | 235/462 |
| 4,193,540 | 3/1980 | Dougados | |
| 4,652,732 | 3/1987 | Nickl | 235/383 |
| 4,872,062 | 10/1989 | Nanba | 235/468 |

FOREIGN PATENT DOCUMENTS 0360249  3/1990  European Pat. Off. .
52-2445  1/1977  Japan .
61-228584 10/1986  Japan .

Primary Examiner—Harold Pitts
Attorney, Agent, or Firm—Frishauf, Holtz, Goodman & Woodward

[57] ABSTRACT

An optical reading apparatus for optically reading information of a symbol on an article is comprised of a bar code reading circuit for emitting laser beams to a bar code printed on a commodity passing in front of the bar code reading circuit and for reading the information of the bar code from the laser beams reflected at the bar code. In the optical reading apparatus the bar code reading circuit includes a plurality of bar code readers which are put toward a path through which the commodity is moved so that read areas formed by the bar code readers contain the article moving path at different angles. A priority decision circuit is provided for applying a selective operation to the data read by the bar code readers.

17 Claims, 10 Drawing Sheets

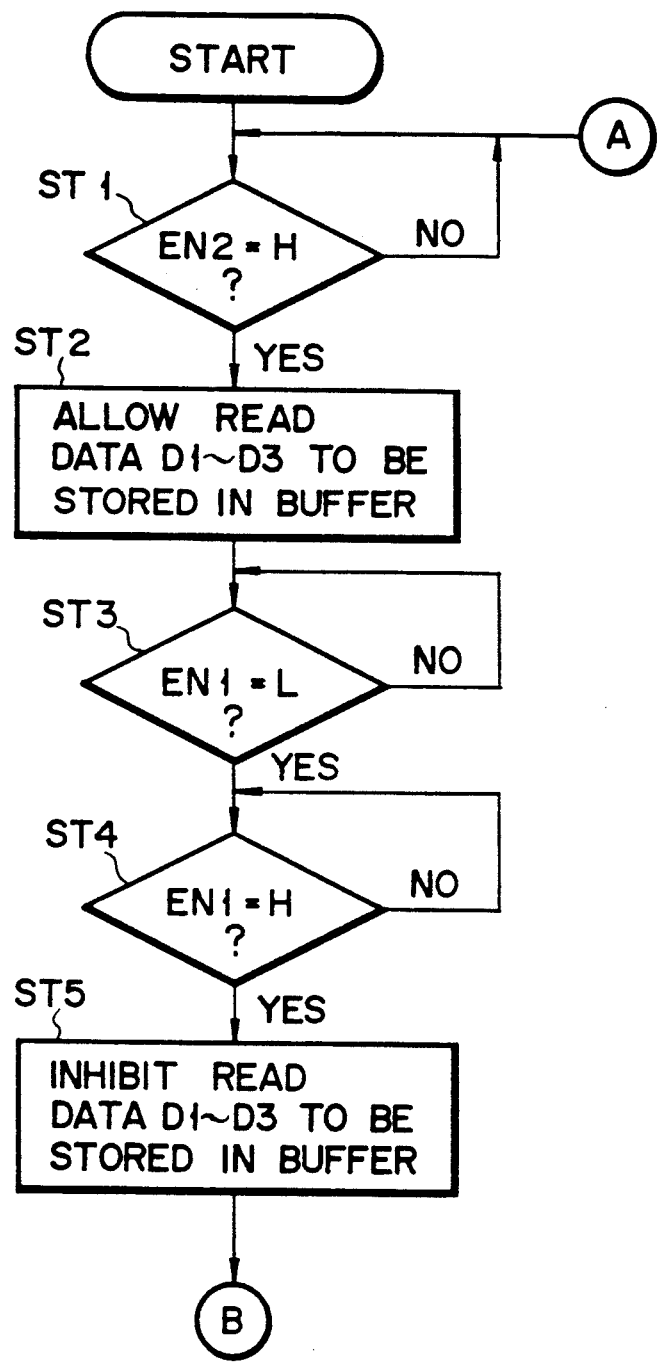
F I G. 8A

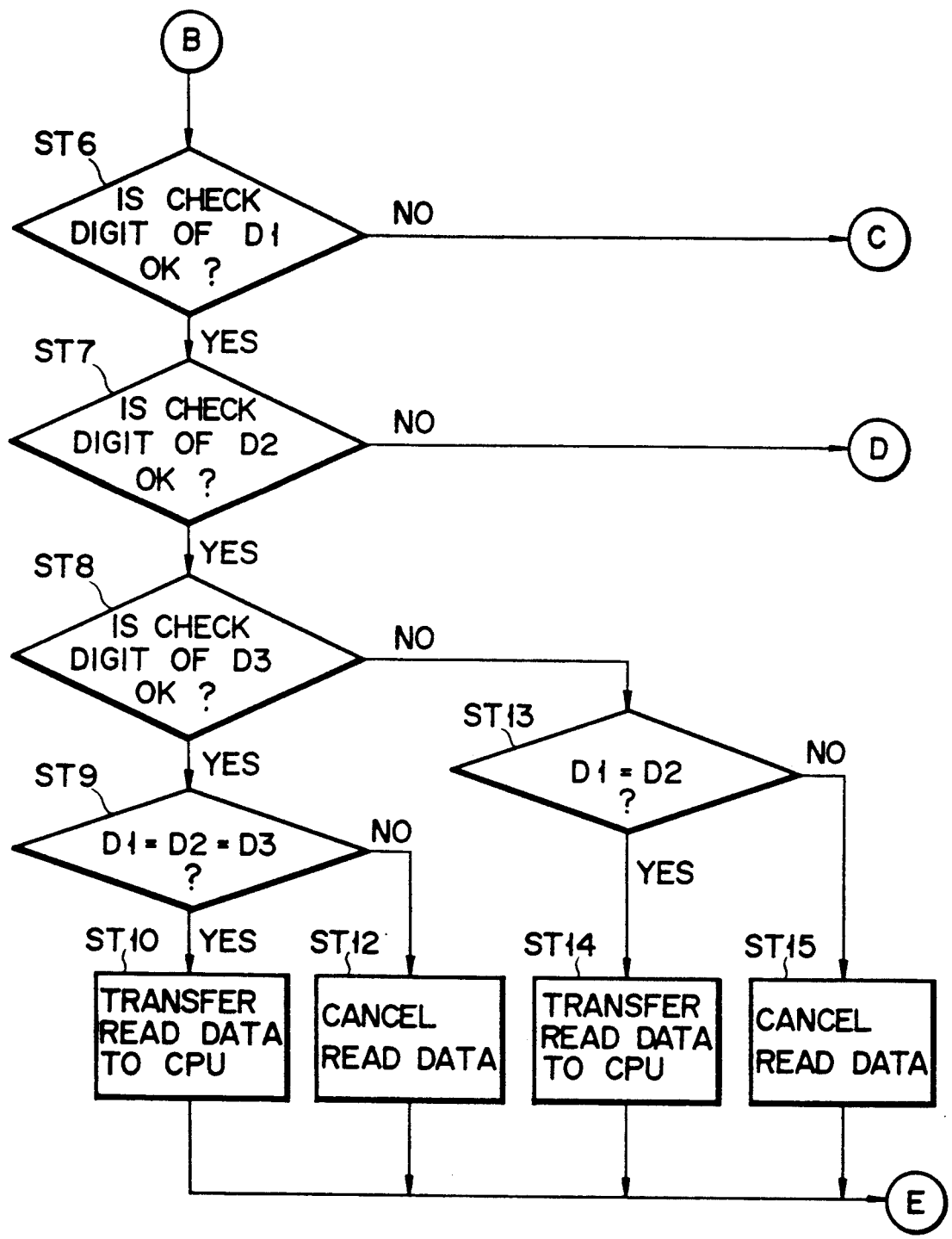
F I G. 8B

OPTICAL READING APPARATUS

This application is a continuation of application Ser. No. 07/407,940, filed Sep. 15, 1989, now abandoned.

BACKGROUND OF THE INVENTION

1. Field of the Invention

The present invention relates to an optical reading apparatus for optically reading various types of information attached to an article.

2. Description of the Related Art

With recent trend of store automation, optical readers for optically reading the data expressed in bar codes printed on commodities have been installed particularly in many big stores, such as supermarkets and chain stores. The optical readers are used in combination with cash registers and POS (point of sales) terminals. The commodity data read by the optical readers are fed to the related cash register and/or POS terminals for the purpose of necessary data processing and storage. When using the optical reader, an operator or cashier picks up one of the commodities contained in a basket, checks a bar code printed area of the picked up commodity and puts the area toward a scanner window of the optical reader, and moves the commodity so faced in front of and across the window.

A bar code printed on the moving commodity is scanned with a laser beam emitted from a laser tube contained in the optical reader and applied through the single window. The laser beam reflected from the bar code is used for reading the bar code expressed data of commodity. A range within which the bar code reader can read the bar code (referred to as a read range) is defined by the size of the window, and additionally an angle of emitting the laser beam, scanning pattern, and an intensity of the reflected light.

Because of presence of those factors limiting the read range, one time read motion by the operator frequently fails to read the bar code. To reduce such failures of bar code reading, the operator checks the bar code printed location on the commodity and turns the location toward the window, and moves the commodity across the window while keeping the bar code printed location faced to the window. Such a bar code reading process physically and mentally strains the operator.

SUMMARY OF THE INVENTION

Accordingly, an object of the present invention is to provide an optical reading apparatus which reliably reads bar code data through one time motion of reading bar code data with less strain of the operator.

According to the present invention, there is provided an optical reading apparatus for optically reading information of a symbol on an article comprising: a plurality of symbol readers for emitting light to a symbol on an article passing in front of the plurality of symbol readers and for reading the information of the symbol from the light reflected at the symbol, the plurality of symbol readers being put toward a path through which the article is moved so that read areas formed by the plurality of symbol readers contain the article moving path at different angles; and data selective circuit for applying a selective operation to the data read by the plurality of symbol readers.

With the structural feature of the optical reading apparatus using a plurality of symbol readers arranged as mentioned above, when reading a symbol such as a bar code printed on a commodity, an operator roughly puts the bar code printed surface toward the article or commodity moving path and moves it across the symbol readers. On the other hand, in the convention optical reading apparatus using a single symbol reader, he must carefully set the bar code printed surface of the commodity exactly within a read range of the symbol reader and moves it across the symbol reader. In this respect, the optical reading apparatus according to the present invention releases the operator from mental and physical strain. A single motion of reading the bar code ensures a reliable bar code reading.

With the control feature of the optical reading apparatus using the priority decision circuit, the necessary single data alone can be supplied to the POS terminal, for example.

BRIEF DESCRIPTION OF THE DRAWINGS

FIGS. 8A to 8C cooperate to show a flowchart useful in explaining the operation of the second embodiment of FIG. 6;

DETAILED DESCRIPTION OF THE PREFERRED EMBODIMENTS

A first embodiment of an optical reading apparatus according to the present invention will be described in detail with reference to FIGS. 1 through 5.

Figure 1:
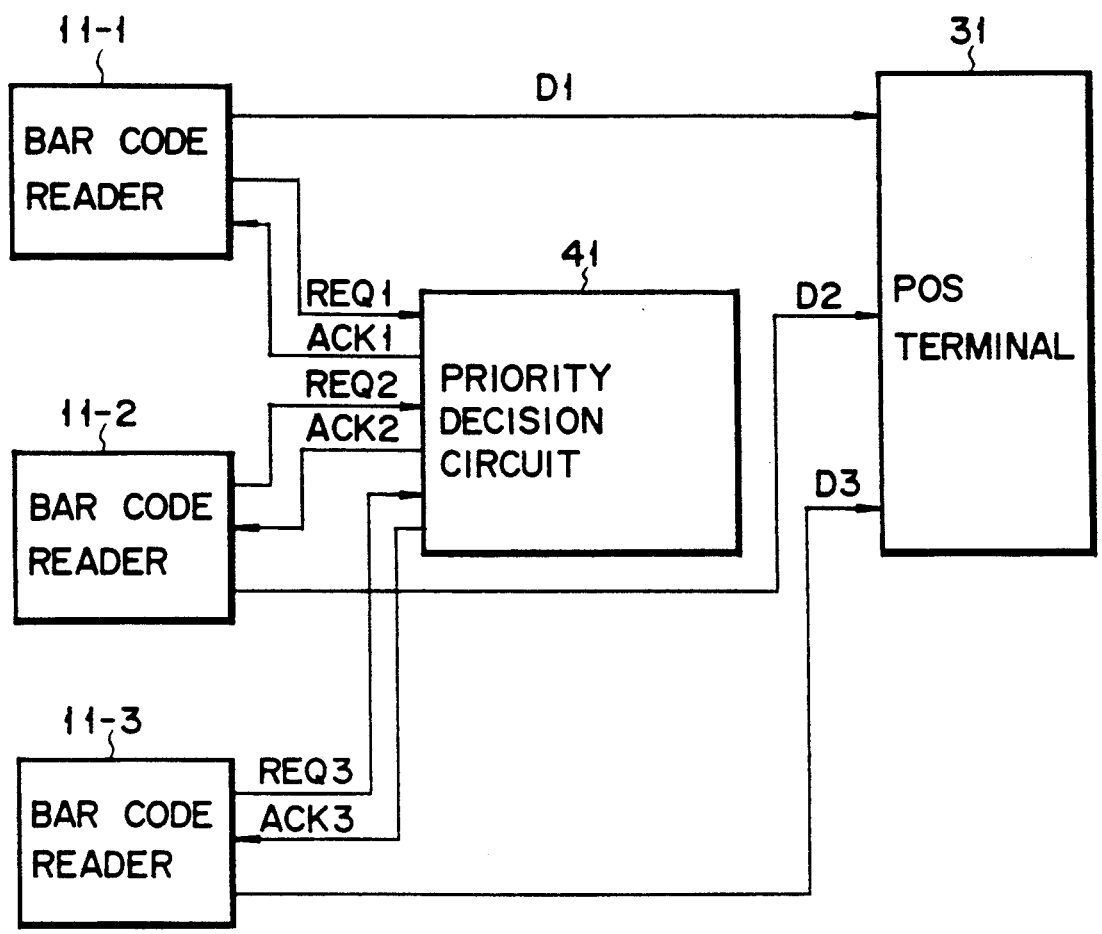
FIG. 1 is a block diagram showing a configuration of an optical reader according to a first embodiment of the present invention.

FIG. 1 shows a configuration of the optical reading apparatus. As shown, the optical reading apparatus is made up of three bar code readers 11-1 to 11-3, a POS terminal 31 for processing the data D1 to D3 read by and supplied from these bar code readers 11-1 to 11-3, and a priority decision circuit 41. In response to data transmission request signals REQ1 to REQ3, the priority decision circuit 41 produces acknowledge signals ACK1 to ACK3. More exactly, in response to the request signal of those REQ1 to REQ3 that first reaches the priority decision circuit 41, the circuit 41 produces an acknowledge signal and sends it to the bar code reader from which the first arrival request signal originated.

Figure 2:
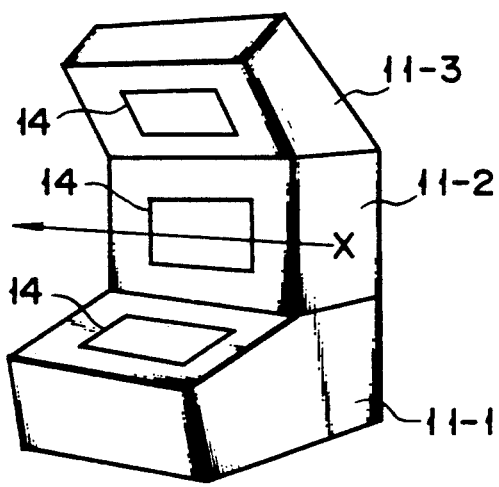
FIG. 2 shows a perspective view of a first example of an assembly of bar code readers involved in the present invention.

The three bar code readers 11-1 to 11-3 are arranged as shown in FIG. 2. The windows 14 of those readers face to an article moving path as indicated by an arrow X. The reader 11-1 is oriented horizontally; the reader 11-2, vertically; the reader 11-3 is slanted upwardly to the left from the boundary between the reader 11-2 and 11-3.

Figure 3:
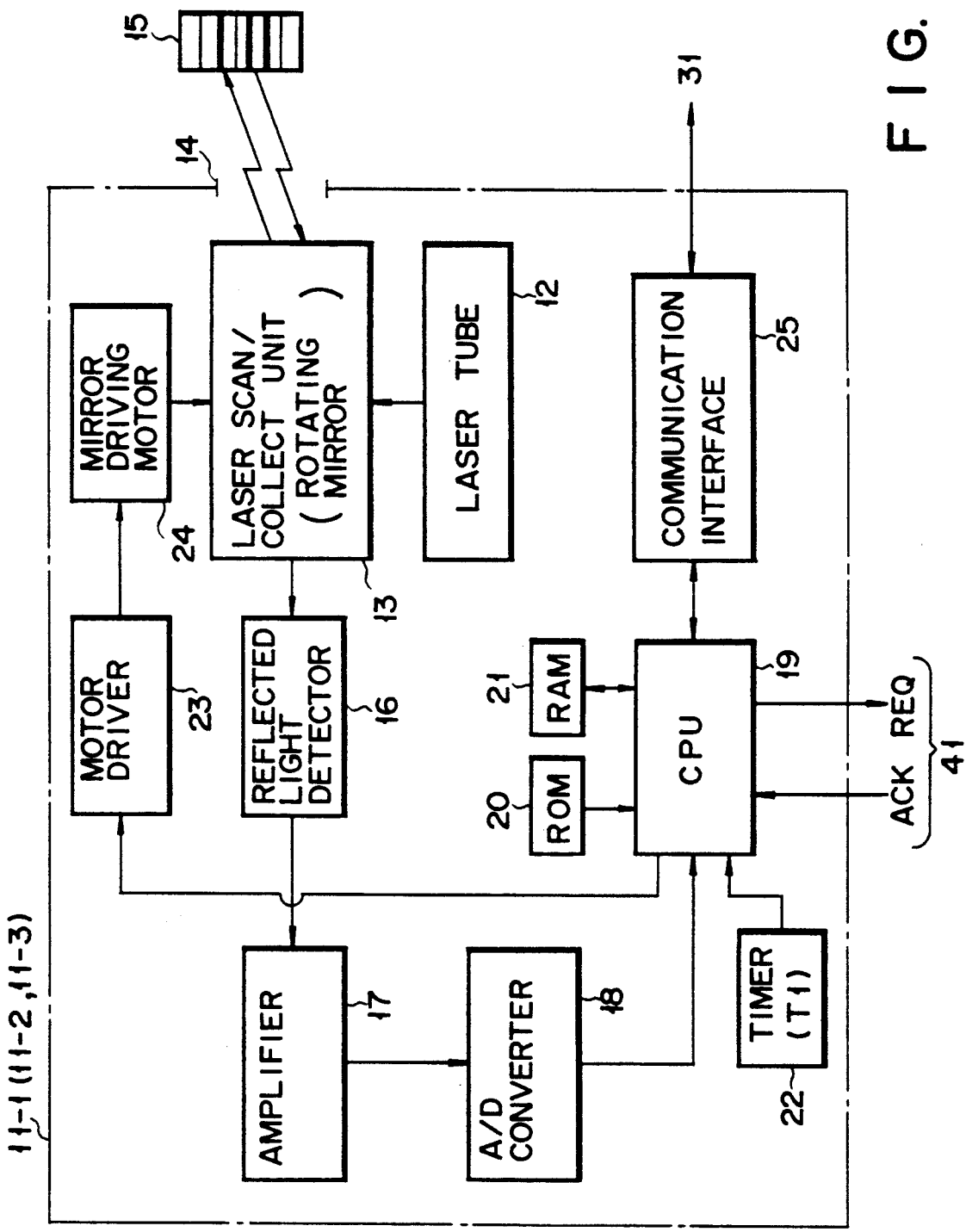
FIG. 3 is a block diagram showing one of the bar code readers used in the first embodiment of FIG. 1.

FIG. 3 typically illustrates a circuit arrangement of the bar code reader 11-1, because the circuit arrangement of the reader 11-1 is the same as those of the remaining readers 11-2 and 11-3. A laser beam emitted from a laser tube 12 is reflected at a rotating mirror (not shown) in the scan/collect unit 13, and is applied to a bar code 15 of a commodity through the window 14. The laser beam hits and reflects at the bar code 15, and returns to the scan/collect unit 13, and is led to a reflected light detector 16. The detector 16 converts the reflected laser beam containing information of bar code into a corresponding electrical signal. The signal is appropriately amplified by an amplifier 17, and applied to an analog to digital (A/D) converter 18. The signal is digitized by the converter 18 and is then applied to a digital system including a CPU 19.

The CPU 19 is coupled with a ROM 20, a RAM 21, and a timer 22. A control program is stored in the ROM 20. Under control of the control program, a motor driver 23 operates to drive a motor 24. The data signal derived from the A/D converter is stored into the RAM 21. The CPU 19 checks if the check digit contained in the data signal is correct or not. If it is not correct, the CPU 19 discards the data. If it is correct, the CPU 19 sends a data transmission request signal REQ1 to the priority decision circuit 41. In case where the priority decision circuit 41 responds to the request signal REQ1 to transmit an acknowledge signal ACK1, which represents permission of data transmission, to the CPU 19, the CPU 19 transmits the data signal through a communication interface 25 to the POS terminal 31. In case where the CPU 19 sends the request signal REQ1, and does not receive the acknowledge signal ACK1 from the priority decision circuit 41 within a period T1 as is set by the timer 22 (see FIG. 5), the CPU 19 ceases the transmission of the request signal REQ. The above processings are exercised by the combination of the CPU 19 and the ROM 20 under control of the control program contained in the ROM 20.

The POS terminal 31 processes the data signals D1, D2, and D3 respectively delivered from the bar code readers 11-1, 11-2, and 11-3 in a predetermined sequence of procedural steps, and sends the result of the data processings to a host computer (not shown).

Figure 4:
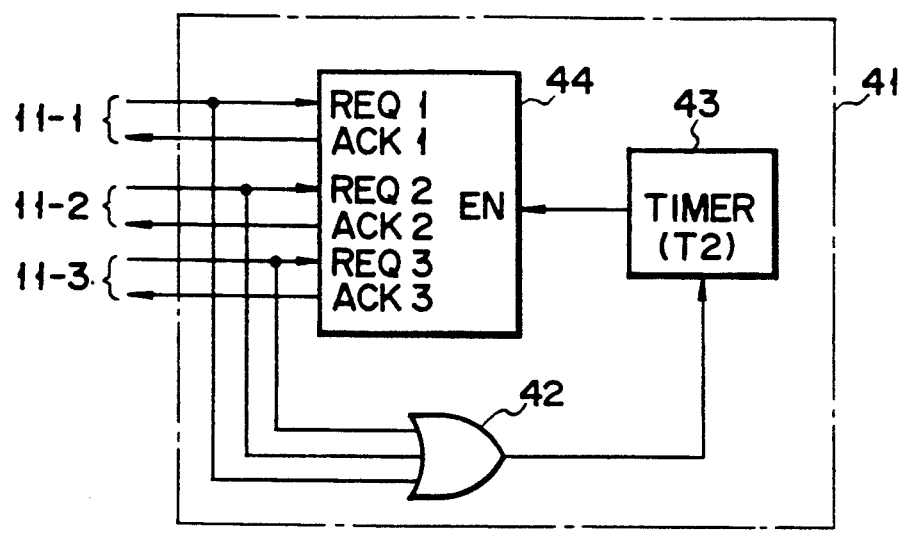
FIG. 4 is a block diagram showing a priority decision circuit used in the first embodiment of FIG. 1.

The details of the priority decision circuit 41 is illustrated in FIG. 4. As shown, the priority decision circuit 41 is made up of an OR gate 42, a timer 43, and a controller 44. The data request signals REQ1 to REQ3 respectively transmitted from the bar code readers 11-1 to 11-3 are coupled for transmission with the OR gate 42. The timer 43 is driven by the output signal of the OR gate 42 to place an enable signal EN in a low level for a predetermined period T2 of time (see FIG. 5). The enable signal EN is outputted from the timer 43 and is applied to an enable terminal EN of the controller 44. A high level state of the enable signal EN indicates that the bar code reader is permitted to read bar code data. When the enable signal EN is in a high level, the controller 44 selects the bar code reader 11 that first issued the request signal REQ from among those readers 11-1 to 11-3, and sends an acknowledge signal to only the selected bar code reader.

An operation of the optical reading apparatus thus arranged will be described.

When an operator moves a commodity in the direction of arrow X in FIG. 2, one or more bar code readers of those readers 11-1 to 11-3 reads the bar code 15 printed on a commodity. If the bar code reader 11-2 reads the bar code, the CPU 19 in the reader 11-2 checks if the check digit contained in the bar code data is correct or incorrect. If it is correct, the CPU 19 sends a request signal REQ2 to the priority decision circuit 41.

The priority decision circuit 41, when the enable signal EN is in a high level, accepts the request signal REQ2, and returns an acknowledge signal ACK2 to the bar code reader 11-2. More specifically, the request signal REQ2 enters the priority decision circuit 41, and passes through the OR gate 42 to reach the timer 43. In turn, the timer 43 is set to place the enable signal EN in a low level for a period T2 of time (see FIG. 5). During this period T2, if the bar code reader 11-1 or 11-3 sends a request signal REQ1 or REQ3 to the priority decision circuit 41, the circuit 41 rejects this request signal.

Figure 5:
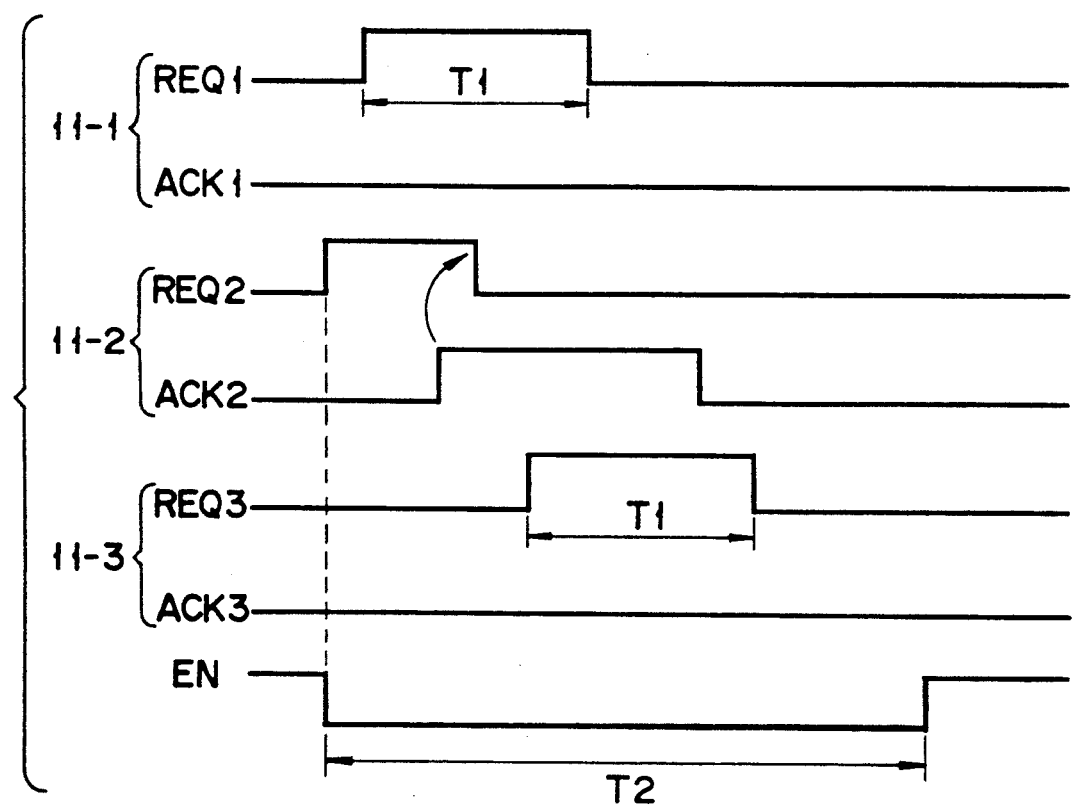
FIG. 5 shows a timing chart useful in explaining the operation of the optical reader of FIG. 1.

A timing chart shown in FIG. 5 describes the operation of the optical reader when the request signal REQ2 derived from the bar code reader 11-2 first reaches the priority decision circuit 41. As seen from the figure, the priority decision circuit 41 does not respond to the request signal REQ1 and REQ3, but it respond to the request signal REQ2 from the bar code reader 11-2. The controller 44 produces the acknowledge signal ACK2 and sends it to the bar code reader 11-2. Upon receipt of the acknowledge signal ACK2, the reader 11-2 sends the bar code data D2 through the interface 25 to the POS terminal 31.

The bar code readers 11-1 and 11-3 produce respectively request signals REQ1 and REQ3 during the period T1 as is set by the timer 22 (see FIG. 3). During this period T1, if the readers 11-1 and 11-3 do not receive acknowledge signals ACK1 and ACK3, the CPUs 19 in the readers clear respectively the bar code data stored in the RAMs 21.

As seen from the foregoing description, from a structural point of view, in the optical reading apparatus of the embodiment, the three bar code readers 11-1 to 11-3 are directed to a common space including the commodity moving path as indicated by the arrow X. With this feature, when a bar code on a commodity is to be read, an operator moves the commodity across the optical reading apparatus. It is only necessary that he puts the bar code area of a commodity in the common space. In optical reading apparatus with a single bar code reader, he must put the bar code surface toward the bar code reader (more exactly, the window in front of the bar code reader) great care. In this respect, the optical reading apparatus according to the present invention requires less care when he moves the commodity for its bar code reading. Accordingly, the one-time motion of reading bar code data infrequently fails to read the bar code data.

From a control point of view, when the commodity is passed through the common space to which the bar code readers are directed, these readers produce data transmission request signals REQ1 to REQ3 for transmission to the priority decision circuit 41. Of those request signals, only the request signal (denoted as REQ here) that first reaches the circuit 41 is accepted by the circuit 41. In response to the request signal REQ, the priority decision circuit 41 produces and sends an acknowledge signal (denoted as ACK) to the bar code reader that produced the first arrival request signal REQ. Further, in the priority decision circuit 41, the timer 43 responds to the first arrival request signal REQ, and places its output signal, or the enable signal EN, in a low level for the period T2. The controller 44 receiving the low enable signal rejects the request signals which can be supplied from bar code readers than the bar code reader other that issued the first arrival request signal REQ. The control feature of the optical reader according to the present invention ensures that one item of commodity data is obtained for each commodity, and hence two or more items of commodity data will never be transmitted to the POS terminal 31.

Another embodiment of an optical reading apparatus according to the present invention will be described with reference to FIGS. 6 through 9.

Figure 6:
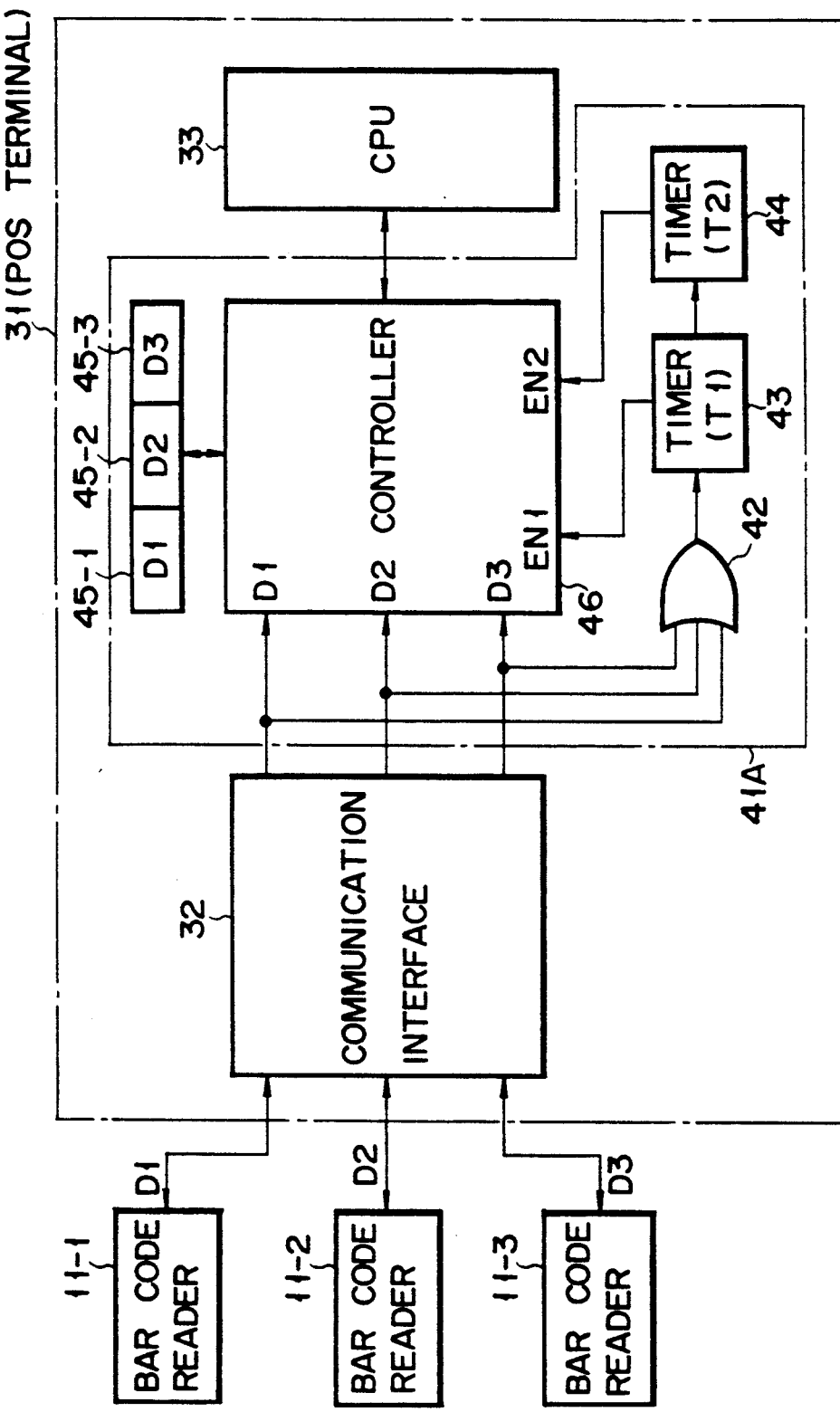
FIG. 6 is a block diagram showing a configuration of an optical reader according to a second embodiment of the present invention.

A circuit arrangement of the optical reading apparatus is illustrated in FIG. 6. In these figures, like reference symbols are used for designating like or equivalent portions in the figures of the first embodiment, for simplicity.

The optical reading apparatus of the instant embodiment includes a plurality of bar code readers, in this instance, three bar code readers 11-1 to 11-3, for optically reading a bar code printed on a commodity. The optical reading apparatus further includes a communication interface 32, a data select circuit 41A, and a CPU 33 provided in a POS terminal 31 for processing bar code data D1 to D3 derived from those readers 11-1 to 11-3. The data select circuit 41A, which is connected between the communication interface 32 and the CPU 33, compares the data D1, D2 and D3 derived from the readers 11-1 to 11-3, and if those items of data are coincident with one another, sends the data to the POS terminal 31.

The three bar code readers 11-1 to 11-3 are arranged as shown in FIG. 2. The windows 14 of those readers face toward a commodity moving path as indicated by the arrow X. In this instance, the reader 11-1 is oriented horizontally; the reader 11-2, vertically; the reader 11-3 is slanted upwardly to the left from the boundary between the reader 11-2 and 11-3.

Figure 7:
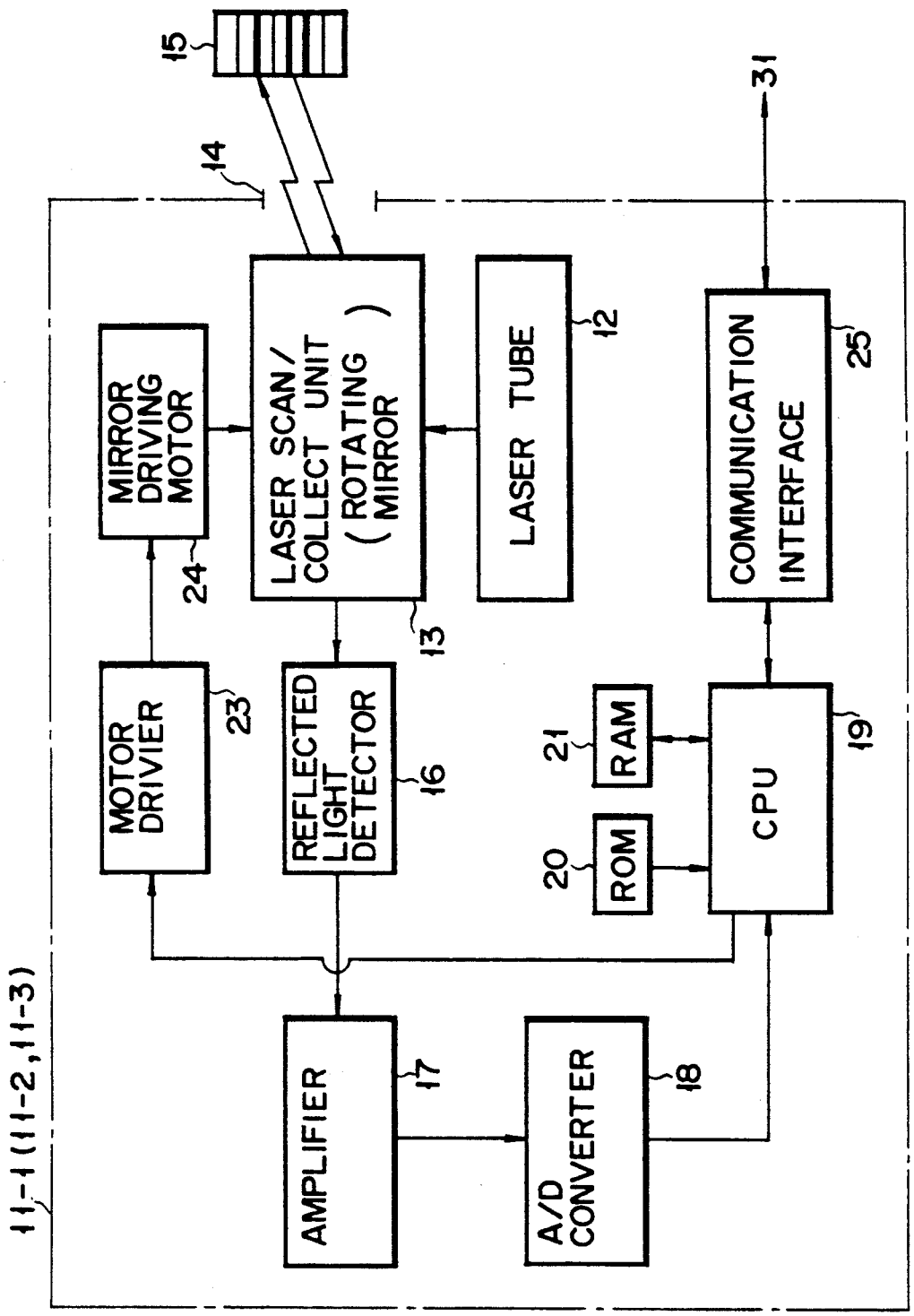
FIG. 7 is a block diagram showing one of the bar code readers used in the second embodiment of FIG. 6.

FIG. 7 typically illustrates a circuit arrangement of the bar code reader 11-1, because the circuit arrangement of the reader 11-1 is the same as those of the remaining readers 11-2 and 11-3. A laser beam emitted from a laser tube 12 is reflected at a rotating mirror (not shown) in the scan/collect unit 13, and is applied to a bar code 15 of a commodity through the window 14. The laser beam hits and reflects at the bar code 15, and returns to the scan/collect unit 13, and is led to a reflected light detector 16. The detector 16 converts the reflected laser beam containing information of bar code into a corresponding electrical signal. The signal is appropriately amplified by an amplifier 17, and applied to an analog to digital (A/D) converter 18. The signal is digitized by the converter 18 and is then applied to a digital system including a CPU 19.

The CPU 19 is coupled with a ROM 20, and a RAM 21. A control program is stored in the ROM 20. Under control of the control program, a motor driver 23 operates to drive a motor 24. The data signal derived from the A/D converter is stored into the RAM 21. The CPU 19 checks if the check digit contained in the data signal is correct or not. If it is not correct, the CPU 19 discards the data. If it is correct, the CPU 19 sends the data to the POS terminal 31.

In the POS terminal 31, the CPU 33 processes the data signals D1, D2, and D3 respectively delivered from the bar code readers 11-1, 11-2, and 11-3 in a predetermined sequence of procedural steps, and sends the result of the data processings to a host computer (not shown).

Figure 8C:
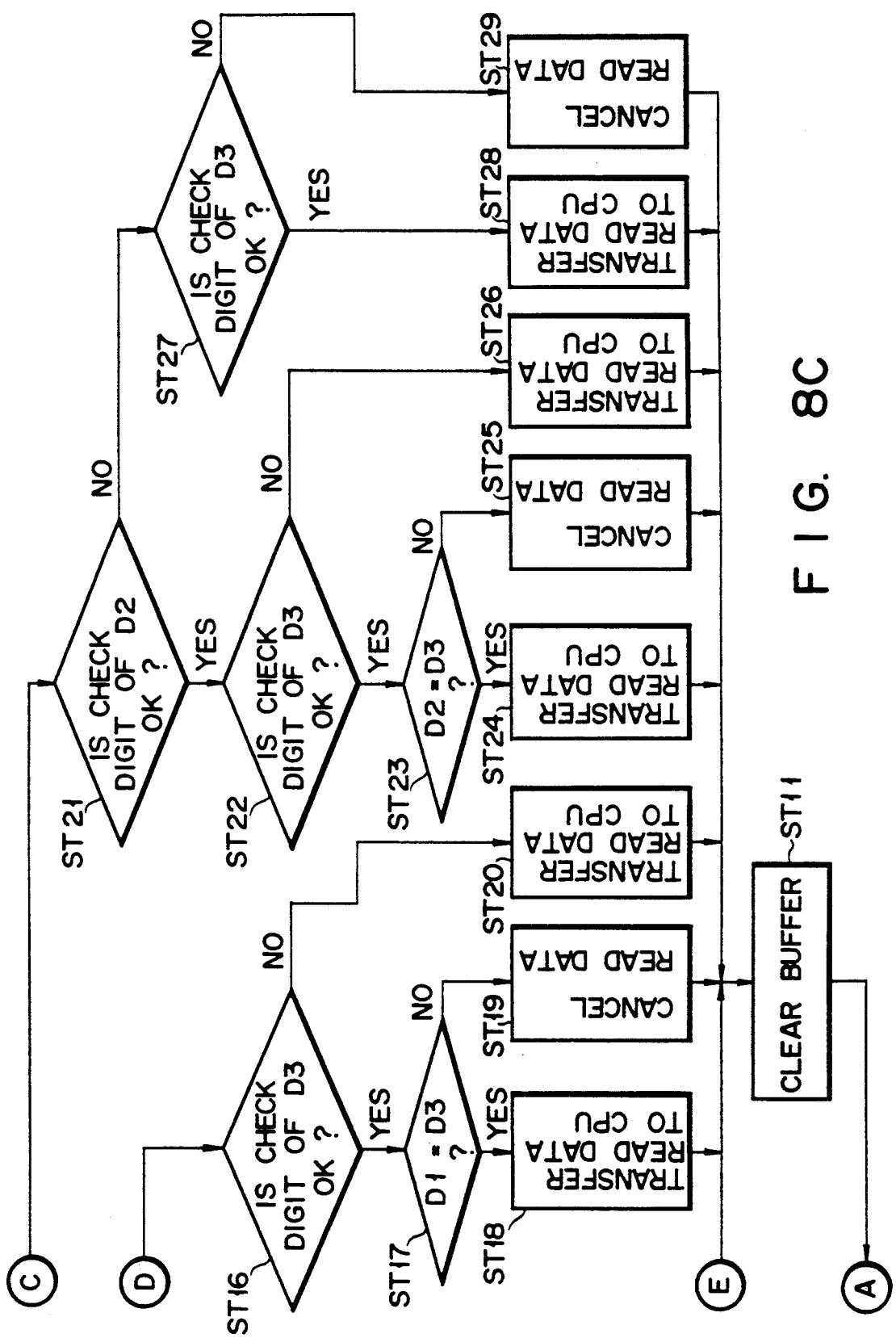
Figure 9:
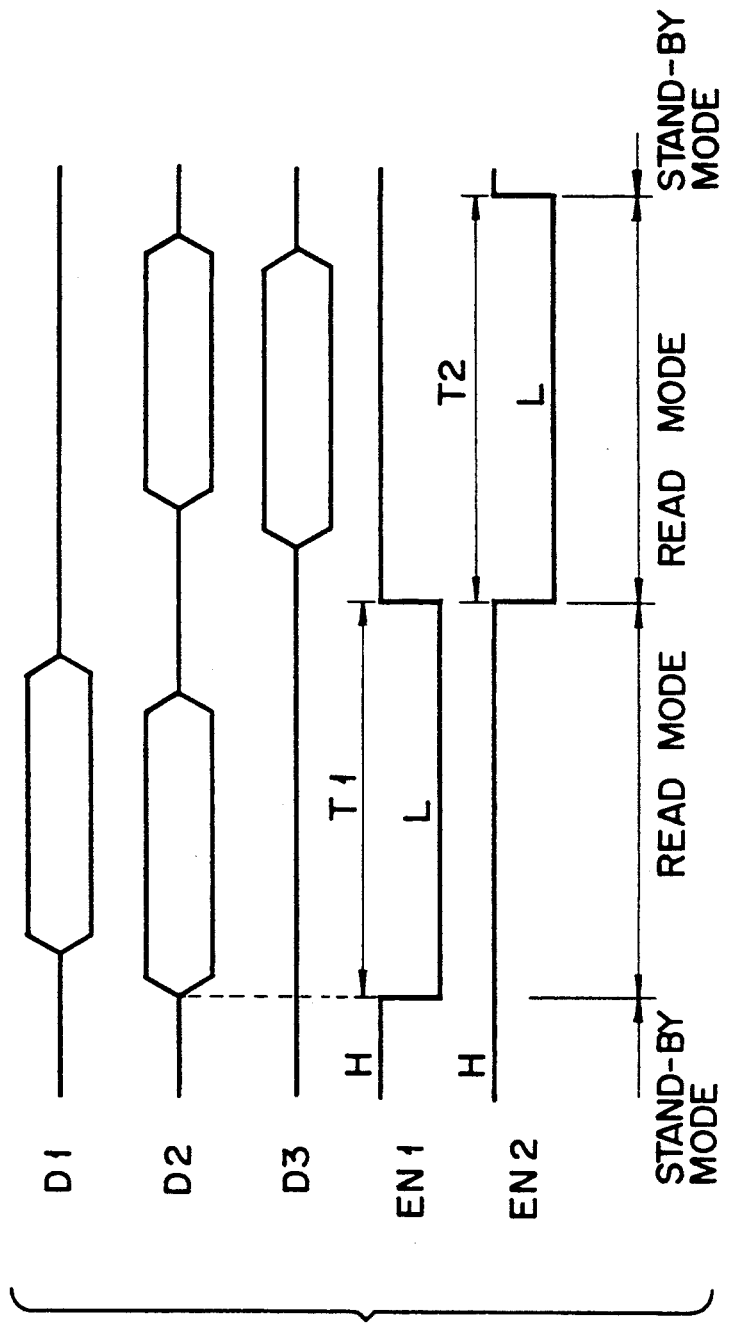
FIG. 9 shows a timing chart useful in explaining the operation of the optical reader of FIG. 6.

The data select circuit 41A is made up of an OR gate 42, timers 43 and 44, buffers 45-1 to 45-3, and a controller 46. The OR gate 42 receives the bar code data from the bar code readers 11-1 to 11-3, through the communication interface 32. The timer 43, which is coupled with the output terminal of the OR gate 42, is driven by the output signal of the OR gate 42, to produce a first enable signal EN1 whose logic level is low for a period T1 of time (FIG. 9). The timer 44, coupled with the output terminal of the timer 43, produces a second enable signal EN2 whose logic level is low for a period T2 (FIG. 9), when the output signal of the timer 43 goes high. The buffers 45-1 to 45-3 temporarily store the bar code data D1 to D3. When the first enable signal EN1 is low in logic level, but the second enable signal is high, the controller 46 loads the data D1 to D3 into the buffers 45-1 to 45-3, and exercises a control shown in FIGS. 8A to 8C. The controller 46 includes a comparing means (not shown) for comparing the data D1 to D3 derived from the bar code readers 11-1 to 11-3, and a control means (not shown) which, when the data D1 to D3 are all coincident with one another, transmits the data to the CPU 33.

As is shown in FIG. 9, the data select circuit 41A, more exactly the controller 46, is placed in a stand-by mode when the enable signals EN1 and EN2 are both high in logic level, in a read mode when the enable signal EN1 is low and the enable signal EN2 is high, and in a read inhibit mode when the enable signal EN1 is high and the enable signal EN2 is low.

An operation of the second embodiment of the optical reading apparatus thus arranged will be described with reference to FIGS. 8A to 8C. The controller 46 exercises the control flow of FIGS. 8A to 8C. In step ST1, the controller 46 checks if the second enable signal EN2 is high in logic level. If it is high, the operation mode of the optical reader is any of the modes other than the read inhibit mode, and the controller 46 advances to step ST2. In this step, the controller 46 permits the data D1 to D3 to be loaded into the buffers 45-1 to 45-3. During the period T1 from an instant that the enable signal EN1 goes low and continues its logic state of low till the signal EN1 goes high again, that is, these logic states are checked in steps ST3 and ST4, the controller 46 loads the data D1 to D3 from the bar code readers 11-1 to 11-3 respectively into the buffers 45-1 to 45-3. In step ST4, if the controller 46 confirms that the enable signal EN1 has returned to a high logic level, it proceeds to step ST5. In this step, the controller 46 inhibits the data D1 to D3 from being loaded into the buffers 45-1 to 45-3.

In steps ST6 to ST8, the controller 46 checks the check digits contained in the data D1 to D3 in successive order. If the check digits are all correct, the controller 46 goes to step ST9 where it checks if D1=D2=D3. If the answer is YES, the controller 46 goes to step ST10. In this step, the controller 46 transmits the data D1 (D2, D3) to the CPU 33, clears the buffers 45-1 to 45-3 (step ST11, FIG. 8C), and returns to step ST1. If any one of the data D1 to D3 is different from the remaining ones, the controller 46 advances to step ST12 to discard the data D1 to D3.

In step ST8, if the answer is NO, that is, the check digit of the data D3 is incorrect, step ST13 is executed to check if D1=D2. If the answer is YES, step ST14 is executed to send the data D1 (D2) to the CPU 33 (step ST14), and then step ST11 is executed. If the answer is NO, the control goes to step ST15 to discard the data D1 and D2.

In step ST7, if the check digit of the data D2 is incorrect, the controller 46 goes to step ST16 where the check digit of the data D3 is checked. If the check digit of the data D3 is correct, the controller 46 goes to step ST17 where check is made as to whether or not D1=D3. If D1=D3, the controller 46 transfers the data D1 (D3) to the CPU 33, and then advances to step ST11. If D1≠D3, the controller 46 discards data D1 and D3 in step ST19. In step ST16, if the check digit of the data D3 is incorrect, the controller 46 transfers the data D1 to the CPU 33 in step ST20, and then goes to step ST11.

If the check digit of the data D1 is incorrect in step ST6, the controller 46 jumps to a loop starting with steps ST21. In steps ST21 and ST22, the check digits of the data D2 and D3 are checked successively. If the answer is YES, control goes to steps ST23 to check if D2=D3. If D2=D3, control goes to step ST24 to transfer the data D2 (D3) to the CPU 33, and then returns to step ST11 in a main loop. If D2≠D3, control goes to step ST25 to discard the data D2 and D3.

If the check digit of the data D3 is incorrect in step ST22, step ST25 is executed to transfer the data D2 to the CPU 33, and then control returns to step ST11.

If the check digit of the data D2 is incorrect in step ST21, control goes to step ST27 to check the check digit of the data D3. If the check digit is correct, control goes to step ST28 and transfers the data D2 to the CPU 33, and returns to step ST11. If the check digit of the data D3 is incorrect, control goes to step ST29 and discards the data D3.

Let us consider a case that as the result of moving a commodity in the arrow direction in FIG. 2, the bar code reader 11-2 produces two items of data D2 and D2, and the bar code readers 11-1 and 11-3 respectively produce data D1 and D3, and those items of data D1, D2 and D3 are applied to the controller 46. The data D2 and D1 as are applied to the controller 46 within the period T1 of the read mode are loaded into the buffers 45-2 and 45-1, respectively, by the controller 46. Then, the controller 46 checks the check digits of the data D1 to D3 in steps ST6 to ST8. In this case, the check digit of the data D3 that is checked in step ST8 is incorrect. Accordingly, step ST13 is executed to check if D1=D2. If the answer is YES, the controller 46 sends the data D1 (D2) to the CPU 33. If the answer is NO, the data D1 (D2) is discarded.

The data D2 and D3 applied to the CPU 46 within the period T2 of the read inhibit mode are discarded because the buffers 45-1 to 45-3 are placed in an inhibit condition.

As described above, since the three bar code readers 11-1 to 11-3 are disposed facing the commodity moving path, the read range is considerably broadened. With this feature, the bar code can reliably be read by roughly directing the bar code printed surface of a commodity toward the space containing the commodity moving path to which the image readers are directed, and by moving the commodity along the commodity moving path. Accordingly, the frequency of the failure-to-read of the bar code per one time motion for the bar code reading is remarkably reduced.

Further, the bar code data that are read by the bar code readers and handled in the optical reading apparatus is reliable. This arises from the feature that the data read within the period T1 of the read mode are compared with one another, and only when the data are coincident with one another, the data is considered as valid data and transferred to the CPU 33.

Further, the read inhibit mode period T2 is provided following the read mode period T1. Two items of bar code data on the same commodity will never be fed to the POS terminal.

It is evident to those skilled in the art that the number of the bar code readers is not limited to three, but it may be reduced to two or increased to four or more.

Figure 10:
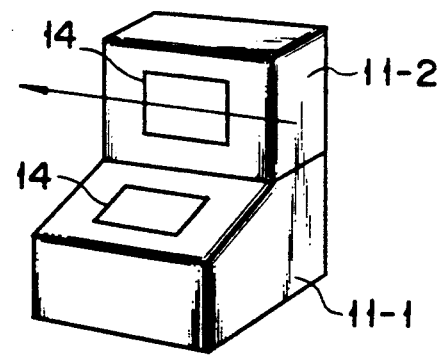
FIGS. 10 to 12 show perspective views of additional examples of an assembly of bar code readers involved in the present invention.
Figure 11:
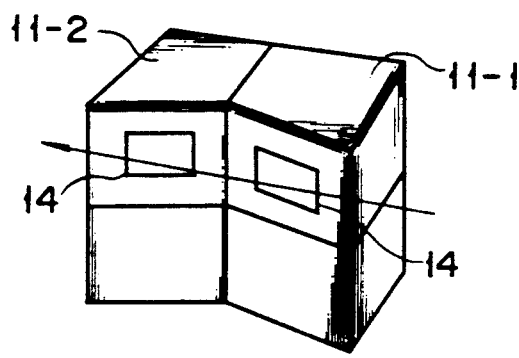
Figure 12:
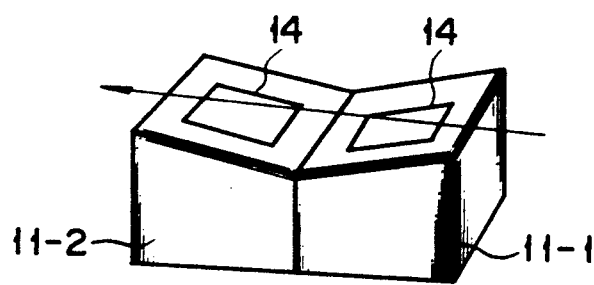

Some exemplars of the arrangements of two bar code readers are shown in FIGS. 10 to 12. In FIG. 10, two bar code readers 11-1 and 11-2 are arranged to be substantially orthogonal to each other. In FIG. 11, two bar code readers 11-1 and 11-2 are arranged vertically and side by side, and are slightly slanted to this side or the commodity moving path as indicated by an arrow with respect to the boundary of the two readers. In FIG. 12, two bar code readers 11-1 and 11-2 are arranged horizontally and side by side and are slanted upwardly with respect to the boundary of the two bar code readers.

In the first embodiment, the priority decision circuit 41 is provided separately from the bar readers 11-1 to 11-3 and the POS terminal 31. If necessary, the circuit 41 may be contained in any of the bar code readers or the POS terminal. If so arranged, the CPU 19 of the bar code reader or the CPU of the POS terminal may be used for the priority decision of the circuit 41.

The second embodiment may be modified such that the data select circuit 41A is provided separately from the POS terminal 31 or is contained in any of the bar code readers 11-1 to 11-3. The bar code data read by the optical reading apparatus may be applied to a cash register or another suitable devices, not the POS terminal.

What is claimed is:

1. An optical reading apparatus for use with an article to which a light reflective symbol is affixed, comprising:
   a plurality of symbol reading means, facing a path through which said article is moved, for reading said symbol by emitting light to scan the article and detecting light reflected from the symbol affixed to said article to respectively generate symbol signals corresponding to data represented by said symbol, wherein all of said plurality of symbol reading means respectively scan primarily different parts of said article when said article is located at a predetermined position along said path; and
   circuit means responsive to signals related to said symbol signals for selecting only one symbol reading means from among a group of said plurality of symbol reading means which have succeeded in reading said symbol to output the symbol signal generated by said one selected symbol reading means.

2. An optical reading apparatus according to claim 1, wherein said plurality of symbol reading means are arranged laterally of said path for emitting said light in a direction substantially perpendicular to said path.

3. An optical reading apparatus according to claim 2, wherein said plurality of symbol reading means include a first symbol reading means placed under said path and a second symbol reading means placed on a side of said path.

4. An optical reading apparatus according to claim 3, wherein said plurality of symbol reading means further include a third symbol reading means placed above said path.

5. An optical reading apparatus according to claim 1, wherein said plurality of symbol reading means are arranged sequentially and along a direction substantially parallel to said path.

6. An optical reading apparatus according to claim 5, wherein said plurality of symbol reading means include first and second symbol reading means placed under said path.

7. An optical reading apparatus according to claim 5, wherein said plurality of symbol reading means include first and second symbol reading means placed on a side of said path.

8. An optical reading apparatus according to claim 1, wherein each of said plurality of symbol reading means includes a reading window through which light is emitted and received, and the reading windows are inclined at different angles with respect to said path such that said primarily different parts of said article are scanned while said article is located at said predetermined position.

9. An optical reading apparatus for use with an article to which a light reflective symbol is affixed, comprising:
   a plurality of symbol reading means, facing a path through which said article is moved, for reading said symbol by emitting light to scan the article and detecting light reflected from the symbol affixed to said article to respectively generate symbol signals corresponding to data represented by said symbol, wherein said plurality of symbol reading means respectively scan primarily different parts of said article; and
   circuit means responsive to signals related to said symbol signals for selecting only one symbol reading means from among said plurality of symbol reading means to output the symbol signal generated by said one selected symbol reading means;
   wherein said selecting means includes determining means for detecting said one symbol reading means which has succeeded in reading the symbol earlier than any other of said plurality of symbol reading means, and for determining the data represented by said symbol as read by said one symbol reading means to be valid.

10. An optical reading apparatus according to claim 9, wherein each of said plurality of symbol reading means includes output means for generating to the selecting means a request signal for transmission of the symbol signal, and for transmitting the symbol signal upon receipt of an acknowledge signal from said selecting means.

11. An optical reading apparatus according to claim 10, wherein said determining means includes control means for (a) detecting said one symbol reading means the output means of which has generated said request signal earlier than that of any of said other symbol reading means, (b) generating said acknowledge signal to be supplied to the output means of said one symbol reading means, and (c) rejecting request signals subsequently generated from the output means of said other symbol reading means.

12. An optical reading apparatus according to claim 11, wherein said output means includes means for checking whether the data represented by said symbol as read by the associated symbol reading means is correct or not, and for disabling generation of said request signal from such symbol reading means when such data is not correct.

13. An optical reading apparatus according to claim 12, wherein said control means includes a timer means for defining a period of time after selecting said one symbol reading means during which said subsequently generated request signals are rejected.

14. An optical reading apparatus for use with an article to which a light reflective symbol is affixed, comprising:
   a plurality of symbol reading means, facing a path through which said article is moved, for reading said symbol by emitting light to scan the article and detecting light reflected from the symbol affixed to said article to respectively generate symbol signals corresponding to data represented by said symbol, wherein said plurality of symbol reading means respectively scan primarily different parts of said article;
   means for verifying whether each of said plurality of symbol reading means has succeeded in reading said symbol; and
   circuit means responsive to signals related to said symbol signals for comparing with each other the symbol signals supplied from a group of symbol reading means which have succeeded in reading said symbol, and for determining data corresponding to one of said symbol signals to be valid if it coincides with at least one other of said symbol signals.

15. An optical reading apparatus according to claim 14, wherein said determining means includes means for checking whether data represented by each symbol signal is correct or not, and excluding symbol signals corresponding to incorrect data from being compared with each other.

16. An optical reading apparatus according to claim 15, wherein said determining means includes first timer means for defining a period of time during which the symbol signals supplied from each of the plurality of symbol reading means is received, and second timer means for defining a period of time during which the symbol signals supplied from each of the plurality of symbol reading means is rejected.

17. An optical reading apparatus for use with an article to which a light reflective symbol is affixed, comprising:
   a plurality of symbol reading means, facing a path through which said article is moved, for reading said symbol by emitting light to scan the article and detecting light reflected from the symbol affixed to said article to respectively generate symbol signals corresponding to data represented by said symbol, wherein all of said plurality of symbol reading means respectively scan primarily different parts of said article substantially simultaneously; and
   circuit means responsive to signal related to said symbol signals for selecting only one symbol reading means from among a group of said plurality of symbol reading means which have succeeded in reading said symbol to output the symbol signal generated by said one selected symbol reading means.

* * * * *